United States Patent [19]

Hughes

[11] Patent Number: 5,019,008

[45] Date of Patent: May 28, 1991

[54] GAME CALL

[76] Inventor: Jeffrey T. Hughes, Rte. 12, Box 270-C, Winston Salem, N.C. 27107

[21] Appl. No.: 500,075

[22] Filed: Mar. 28, 1990

[51] Int. Cl.5 .............................................. A63H 5/00
[52] U.S. Cl. .................................... 446/207; 446/418
[58] Field of Search .............................. 446/202–209, 446/397, 418; 84/402, 402 C, 422.4

[56] References Cited

U.S. PATENT DOCUMENTS 1,495,672  5/1924  Cheney ............................. 84/402 X
2,642,699  6/1953  Green ................................... 446/397
4,850,928  7/1989  Stewart .............................. 446/397
4,940,451  7/1990  Leady ............................ 446/202 X Primary Examiner—Mickey Yu

[57] ABSTRACT

A game call device for ruminant animals is provided having an elongated cylindrical member which includes a corrugated section for stropping with a similar device to produce the sound of deer antler gashing. The game call also includes an air driven sound producing mechanism whereby blowing through an inlet at one end of the cylindrical member creates a sound similar to the vocal sounds made by a deer.

6 Claims, 2 Drawing Sheets

GAME CALL

BACKGROUND OF THE INVENTION

1. Field Of The Invention

The invention described herein pertains to devices used by hunters, photographers or others to attract or call wild game and specifically to devices which provide audible sound waves for enticing deer and other ruminant animals.

2. Description Of The Prior Art And Objectives Of The Invention

Various auditory sound producing devices have been used through the years by hunters to attract different types of game. Duck calls have long been used as have moose and deer calls in an attempt to emulate the vocal sounds made by a particular animal. Other devices have been used in the past to duplicate the sounds of a deer polishing or gashing antlers against tree trunks or limbs. Such devices used by hunters in the past have achieved some degree of success under specific conditions but to date no one has combined both types of devices into one convenient instrument. Therefore, it is one objective of the present invention to provide a game call for deer or other ruminant game for use by a hunter that includes a combination for producing both antler and vocal game sounds.

It is another objective of the present invention to provide a game call which is formed in the shape of a hollow tubular member and includes a series of annular ridges.

It is also an objective of the present invention to provide a compact game call which is formed from a lightweight, durable plastic which can be easily carried and readily available for use by the hunter when needed.

It is still another objective of the present invention to provide a game call which is relatively simple in construction and which can be manufactured and sold at an economical price.

Various other objectives and advantages of the present invention become apparent to those skilled in the art as a more detailed description is presented below.

SUMMARY OF THE INVENTION

The aforesaid and other objectives are realized by providing a game call which is molded from a durable plastic in the form of an elongated, substantially hollow cylindrical member. A corrugated section of the cylindrical member includes a plurality of equally spaced, radially extending annular ridges. The outer surface of the cylindrical member between each of the ridges is curved in a cross-sectional concave manner and each of said ridges has a flat crest. Contiguous to the corrugated section is a smooth outer surface section which comprises approximately 50–60% of the length of the cylindrical member. The game call includes within the hollow interior, sound emanating components having a vibrator whereby, when air is blown into an air inlet at the proximal end of the cylindrical member, the air passes through the cylindrical member and strikes the vibrator which produces a sound similar to the vocal sounds of a deer. Also an antler gashing sound can be produced by manually stropping a pair of corrugated sections against one another in a somewhat rapid fashion, thereby creating sounds as would be made when a deer rubs or abrades his antlers against tree trunks or limbs.

DESCRIPTION OF THE PREFERRED EMBODIMENT

Figure 2:
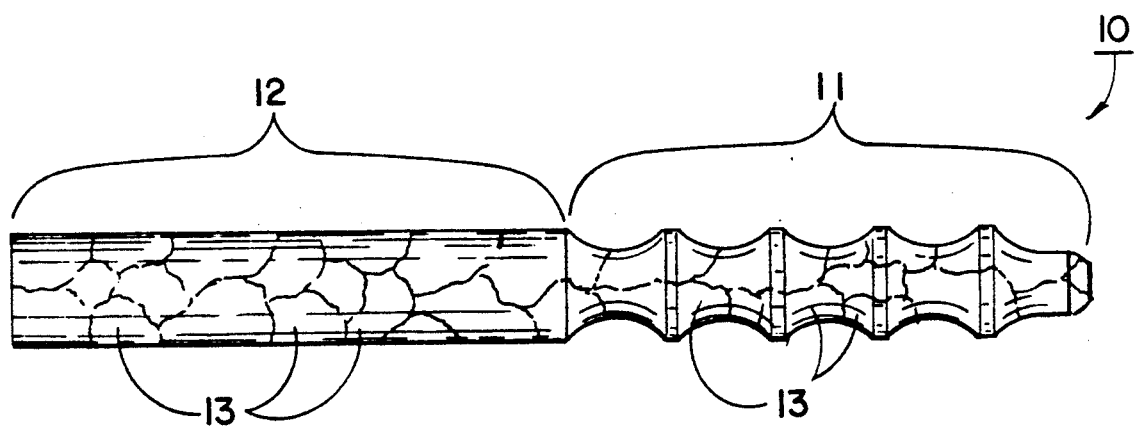
FIG. 2 shows the game call as in FIG. 1 in a side elevational view to better illustrate the dimensions of the corrugated and smooth sections.
Figure 3:
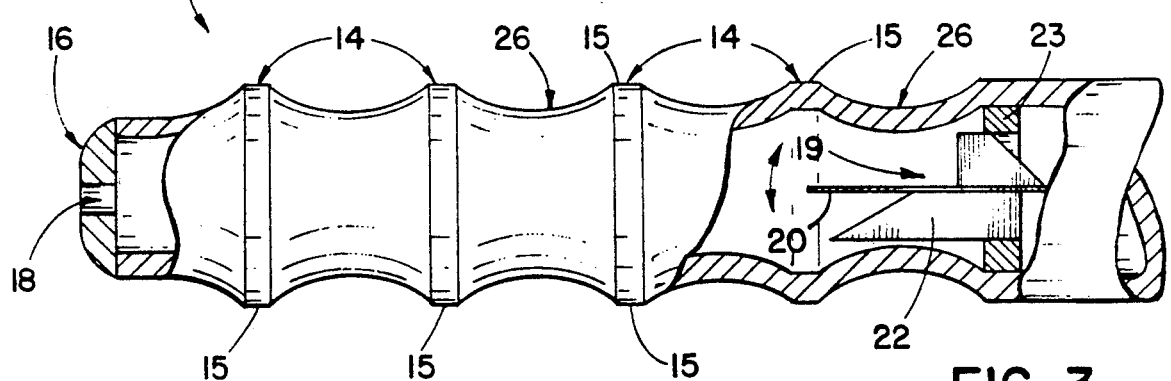
FIG. 3 shows in cut-away fashion certain inner components of the game call.

The preferred form of the invention is shown in FIGS. 2 and 3 whereby a hollow cylindrical member is formed from polystyrene with camouflage coloring along the outer surface. The proximal section is corrugated, having a series of flat crested annular ridges and valleys therealong whereas the second or distal section has a smooth outer tubular configuration. Positioned within the cylindrical member at approximately the juncture of the corrugated and smooth sections is a vibrator whereby air, which can be blown through an inlet at the proximal end, will strike the vibrator to generate a sound comparable to the vocal sounds of a deer. The corrugated section is used by stropping it against a similar corrugated section of an identical game call to provide a sound comparable to antler gashing. Both the vocal and gashing sounds will attract nearby deer.

DETAILED DESCRIPTION OF THE DRAWINGS AND OPERATION OF THE INVENTION

Figure 1:
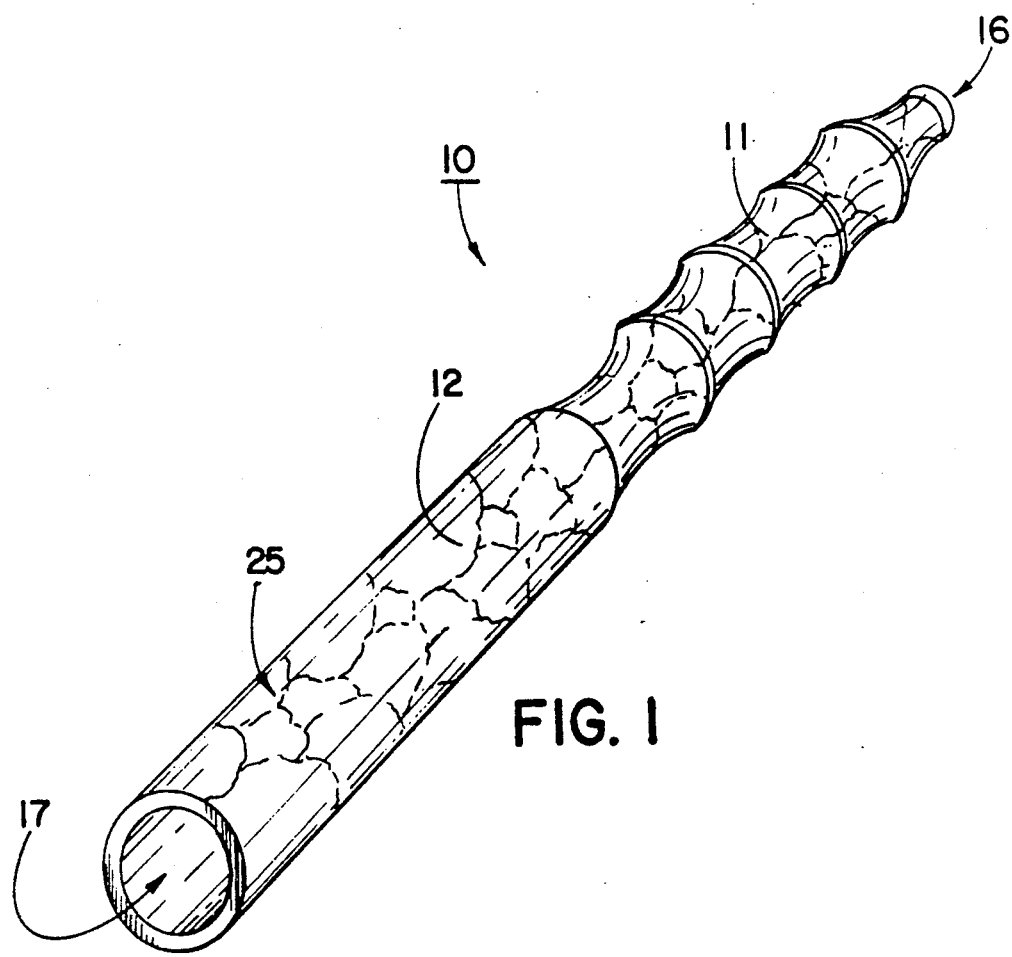
FIG. 1 illustrates in perspective fashion the game call of the present invention.

For a more detailed presentation of the invention, turning now to the drawings, FIG. 1 illustrates in perspective fashion game call 10 formed from a substantially hollow elongated cylindrical member 25 which includes a proximal corrugated section 11 and a smooth distal section 12. Game call 10 is formed from a durable synthetic polymer such as polystyrene but may be formed from other polymeric materials, wood or other materials suitable therefor. In FIG. 2 game call 10 is shown with camouflage coloration 13 which will help conceal it while walking and use by a hunter. Game call 10 may have dimensions of approximately eleven and one-half inches in length, one and one-quarter inches in diameter, and may weigh approximately five to six ounces, depending on the particular materials and dimensions selected.

Figure 4:
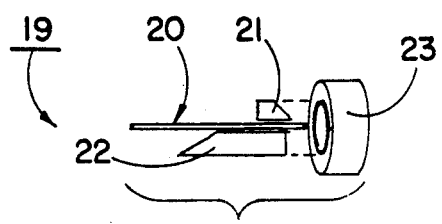
FIG. 4 demonstrates the disassembled sound producing vibrator therein.

In FIG. 3, corrugated section 11 is shown enlarged with a plurality of four equally spaced annular ridges 14, each of which have a flat crest 15 thereon. Corrugated section 11 includes valleys 26 between ridges 14 that provide a smooth concave cross sectional surface. As further shown in FIG. 3, proximal end 16 of game call 10 includes air inlet 18 through which air is blown striking vibrator 19 which acts as a means to emanate vocal deer sounds and which includes movable reed 20 as shown in FIG. 4. Reed 20 is maintained within collar 23 by top wedge 21 and base wedge 22. By blowing air into inlet 18 a deer-like sound will pass through distal end 17 as shown in FIG. 1. Vibrator 19 is formed from plastic and is a conventional commercial item and can be purchased with reeds of a variety of tonal qualities to emulate does, bucks or other animals of the ruminant variety.

Figure 5:
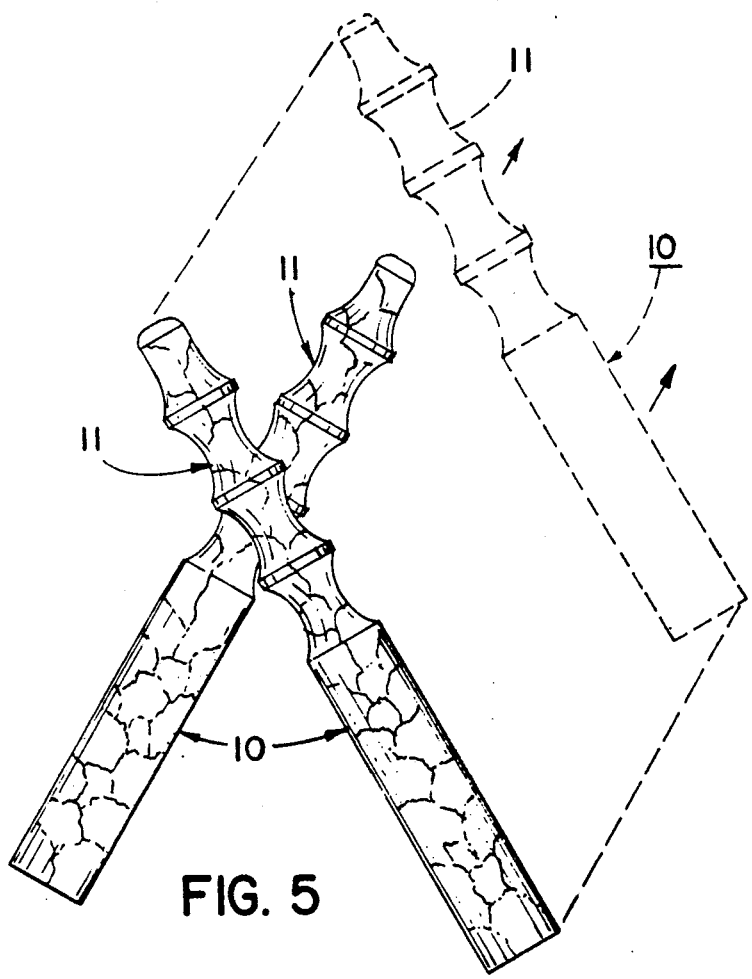
FIG. 5 illustrates the method of stropping to produce antler gashing sounds.

In order to generate another sound of a deer, other than the vocal variety as explained above, a pair of game calls 10 having corrugated sections 11 can be manually held, one in each hand, and by stropping as illustrated in FIG. 5, "antler gashing" can be simulated. The sounds produced will attract certain deer and which may be of more benefit and advantage in certain instances than reproducing vocal sounds as earlier explained.

The illustrations and examples provided herein are for explanatory purposes and are not intended to limit the scope of the appended claims.

I claim:

1. A game call comprising in combination: a pair of substantially hollow elongated members, said members comprising a section having a smooth outer surface and a section having a corrugated outer surface, a vibrator, said vibrator positioned within one of said elongated members to provide a desired sound when air is directed therethrough and whereby stropping one corrugated surface against the other will call game.

2. A game call as claimed in claim 1 wherein said corrugated outer surfaces comprises ridges having substantially flat crests.

3. A game call as claimed in claim 1 wherein said elongated hollow members are cylindrical.

4. A game call as claimed in claim 1 wherein the outer surface of said hollow members between said annular ridges is curved.

5. A game call as claimed in claim 4 wherein said curved surfaces are concave in cross-section.

6. A game call as claimed in claim 1 and including an air inlet, said inlet positioned on one end of said hollow member and spaced from said vibrator.

* * * * *